United States Patent [19]

Heath et al.

[11] Patent Number: 4,714,199
[45] Date of Patent: Dec. 22, 1987

[54] LIQUID ATOMIZING NOZZLE FOR SPRAY APPARATUS

[76] Inventors: Allan B. Heath, 3819 Electric Ave.; Richard G. Gossman, 2525 Wright St., both of Port Huron, Mich. 48060

[21] Appl. No.: 861,548

[22] Filed: May 9, 1986

[51] Int. Cl.⁴ ............................................. F16K 27/00
[52] U.S. Cl. .................................. 239/412; 239/429; 239/434; 251/205
[58] Field of Search ............... 251/118, 205; 239/580, 239/586, 410, 412, 453, 419, 8, 407, 427, 427.3, 434, 433, 429–431, 419.5, 600

[56] References Cited

U.S. PATENT DOCUMENTS

| 895,668 | 8/1908 | Newman | 239/433 X |
|---|---|---|---|
| 1,080,244 | 12/1913 | Whitten | 239/419 |
| 1,712,326 | 5/1929 | Brock | 239/419 |
| 2,764,995 | 10/1956 | Krupp et al. | 251/205 X |
| 3,182,950 | 5/1965 | Stone | 251/63 |
| 3,342,378 | 9/1967 | Mezoff et al. | 239/433 X |
| 3,393,658 | 7/1968 | Ott | 118/7 |
| 3,394,888 | 7/1968 | Dasse et al. | 239/424 |
| 3,512,550 | 5/1970 | Ammann | 137/553 |
| 3,561,680 | 2/1971 | Ott | 239/411 |
| 3,779,305 | 12/1973 | Pondelicek et al. | 164/312 |
| 3,807,641 | 4/1974 | Albright | 239/412 |
| 3,888,420 | 6/1975 | Boelkins | 239/412 |
| 3,920,099 | 11/1975 | Pondelicek et al. | 184/55 A |
| 3,995,717 | 12/1976 | Kroffke | 184/7 F |
| 4,027,744 | 6/1977 | Kuhnelt et al. | 137/624.13 X |
| 4,041,899 | 8/1977 | Wolfe et al. | 118/323 |
| 4,365,754 | 12/1982 | Levine et al. | 239/412 |
| 4,562,966 | 1/1986 | Smith et al. | 239/433 |
| 4,567,912 | 2/1986 | Levine | 137/606 |

Primary Examiner—Andres Kashnikow
Assistant Examiner—Kevin Patrick Weldon
Attorney, Agent, or Firm—Harness, Dickey & Pierce

[57] ABSTRACT

This invention relates to a nozzle assembly used to atomize liquids within air, particularly useful for coating die surfaces with die release lubricants. The atomizing nozzle includes an internal poppet valve element which is operated to control the flow of lubricant in response to a control air pressure signal. Blow air is initially transmitted to a pre-atomization area where some air is introduced in the lubricant which is thereafter introduced into the main blow air stream. This pre-atomization function has been found to enable fine atomization at low flow rates of lubricant. The pre-atomization bore further enables the device to be self-cleaning by clearing out the lubricant passage. Fine control over lubricant flow rate is provided by an elliptical shaped orifice which is closed off by the end of the poppet valve element. Apparatus for preventing contaminants from entering the poppet valve chamber and coating the inside of the chamber with lubricant are also provided in the form of a small bleed passage formed by the head of the poppet element.

17 Claims, 5 Drawing Figures

LIQUID ATOMIZING NOZZLE FOR SPRAY APPARATUS

BACKGROUND AND SUMMARY OF THE INVENTION

This invention relates to a nozzle assembly, and particularly, to one which atomizes a liquid lubricant into an air stream particularly useful for coating mold cavities with a lubricant film.

The molds and dies used in casting operations require a very thin uniformly distributed coating of a liquid release agent on the forming surfaces to enable the workpieces to be easily removed from the machine at the completion of the forming operation. Numerous designs presently exist for nozzle devices which are designed to atomize release agents in air. Several of such devices are encompassed by U.S. Pat. Nos. 4,365,754 and 4,567,912 which are assigned to the assignee of this application and which are hereby incorporated by reference. Designers of such nozzles are constantly striving to improve their performance and compactness. One problem associated with some prior art nozzle devices is the presence of "slug fog" coating problems wherein an uneven ratio of liquid is mixed with air during the spray cycle or liquid drops fall from the nozzle outlet. This problem is largely attributable to the fact that nozzles are typically supplied with liquid under constant pressure, whereas a blow or atomizing air signal is intermittently applied. Variations in the blow air flow at the beginning and end of the operating cycle in conjunction with the fixed pressure of liquid results in a varying atomized liquid concentration. Such problems are also attributable to the presence of liquid trap areas within the nozzle which cause excessive amounts of liquid to be discharged at the beginning of the spray cycle. Such inconsistent liquid concentration conditions can result in excessive amounts of lubricant being applied at localized portions of the die cavity, thus causing uneven "spot" cooling of the die cavity and waste of lubricant material.

Another desirable feature for an atomizing nozzle is the ability to precisely control the flow of liquid atomized within the air stream and to provide finely atomized and uniformly dispersed droplets. These features are desirable to optimize consumption of the liquid release agent and to provide uniform coating of the forming apparatus surfaces. Another design objective is to minimize the number of moving parts within the atomizing nozzle to increase system reliability and minimize fabrication costs. It is further desirable to simplify the machining steps necessary to produce an atomizing nozzle as another step toward reducing component costs.

The above-mentioned U.S. patents assigned to the assignee of this invention largely address the above-mentioned shortcomings of prior art atomizing spray nozzles. However, it is desirable to provide additional refinements for such devices, and particularly, to improve their performance at low liquid flow rates and their ability to provide precise liquid flow adjustment. It was further desired to minimize the overall size of the spray nozzle. The present invention provides the above-mentioned desirable features. The nozzle of this invention is small and compact, making it easy to install, and is capable of a broad range of liquid flow rates while providing fine droplet size even at extremely low liquid flow rates. The nozzle is further self cleaning and dripless since the nozzle is completely cleared of liquid when it is at rest. Novel means are provided for enabling precise flow control changes through the use of an elliptically shaped flow control orifice. Very thorough atomization of the liquid is achieved through the use of a pre-atomization system which further improves the ability to provide minute droplet size. The device according to this invention further employs a single moving part and can be machined using conventional processes.

Additional benefits and advantages of the present invention will become apparent to those skilled in the art to which this invention relates from the subsequent description of the preferred embodiments and the appended claims, taken in conjunction with the accompanying drawings.

DETAILED DESCRIPTION OF THE INVENTION

Figure 1:
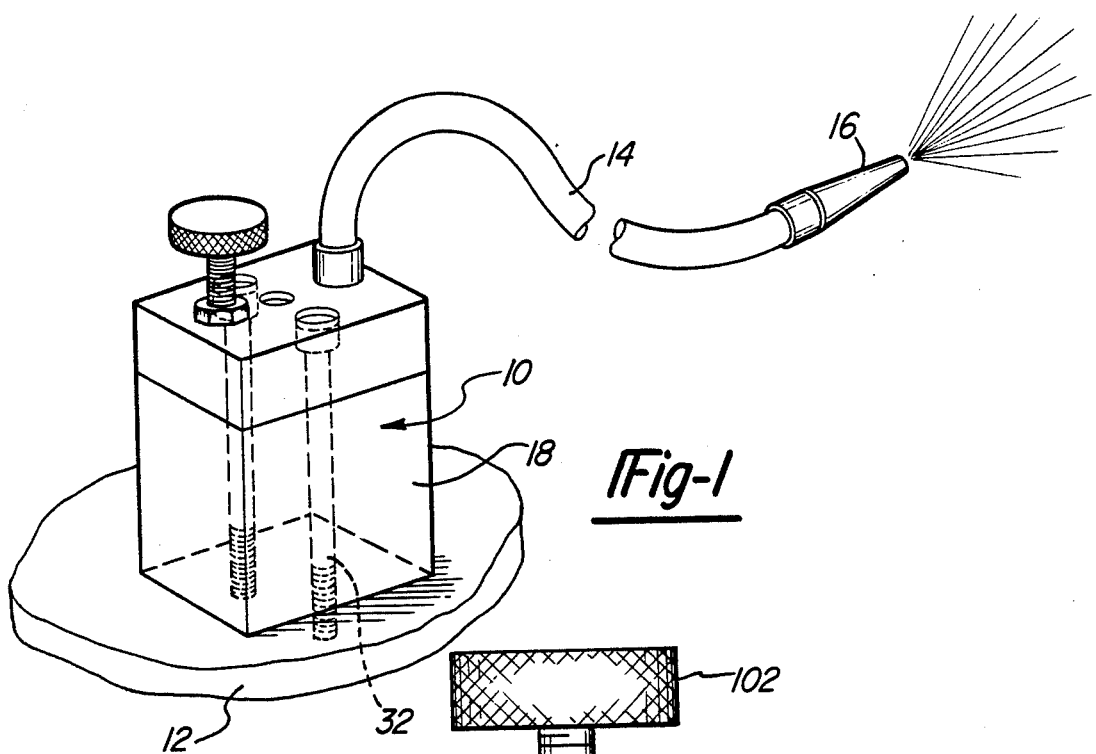
FIG. 1 is a pictorial view of a liquid atomizing nozzle in accordance with this invention shown connected to a flexible conduit and a spray orifice and mounted to a nozzle mounting manifold.

An atomizing nozzle in accordance with this invention is shown by each of the Figures and is generally designated by reference number 10. Atomizing nozzle 10 is shown in FIG. 1 fastened to manifold 12 having a liquid supply port, a control air port and a blow air supply port (not shown). Discharge conduit 14 conducts atomized liquid to discharge orifice 16 which may be remotely mounted from nozzle 10. As previously mentioned, atomizing nozzle 10 is adapted to atomize die release agents or lubricants (referred to herein broadly as liquids) for coating die cavity surfaces. In use, a plurality of nozzles 10 would ordinarily be used, and therefore, manifold 12 has provisions to accept many individual nozzles.

The internal construction features of atomizing nozzle 10 are shown in detail in FIGS. 2 through 5. Housing 18 is made of two assembled housing portions, including upper portion 20 and lower portion 22 which are held together by threaded fastener 24 installed within blind bore 26. Housing 18 further defines a pair of separated bores 28 and 30 which enable the housing to be mounted to manifold 12 by fasteners 32. Housing 18 has an elongated stepped diameter passageway 34 defining an enlarged diameter poppet valve chamber 36 with poppet stem portion 38 and adjusted screw portion 40. Vent port 42 vents the upper portion of poppet valve chamber 36 to the atmosphere. The external end of poppet stem passageway portion 38 defines an annular shoulder 44 which supports seal 46. Control air passageway 48 is provided which communicates with the lower portion of poppet valve chamber 36 and defines annular shoulder 50 for seal 52. Stepped passageway 54 is provided within housing 18 which is generally parallel to but spaced from passageway 34 and defines diameter portion 56 and enlarged diameter portion 58. The lower extremity of diameter portion 56 forms annular shoulder 60 for seal 62. The upper extremity of enlarged passageway portion 58 has internal threads 64 adapted to receive conduit 14 or a spray orifice. "O" ring 108 positioned between housing portions 20 and 22 prevents fluid leakage from passageway 54.

Figure 4:
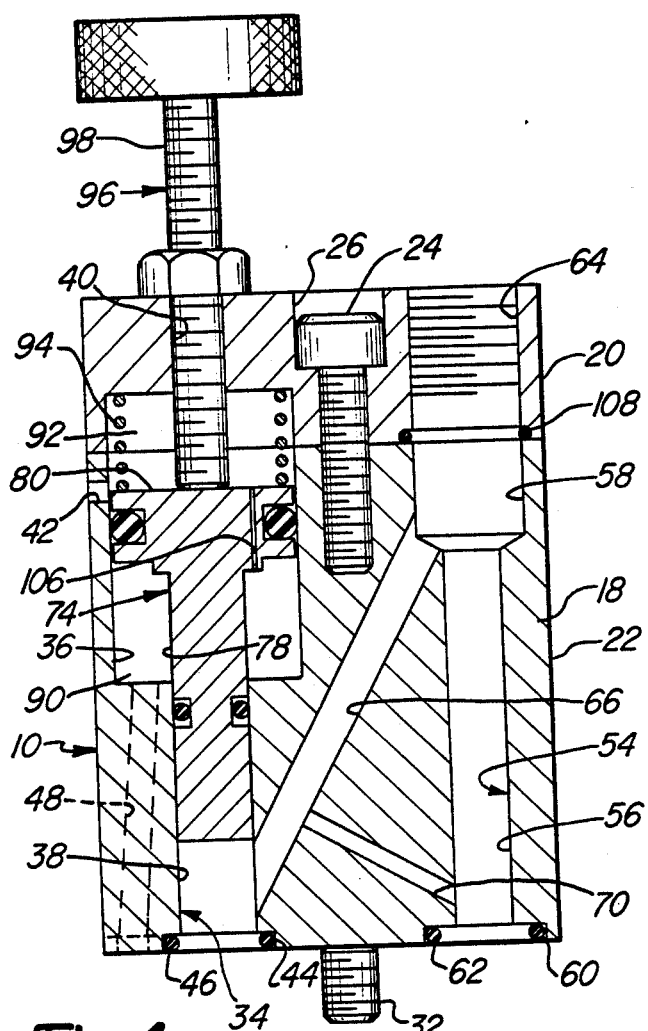
FIG. 4 is a cross-sectional view similar to FIG. 3 except showing the nozzle elements in the operating position.
Figure 5:
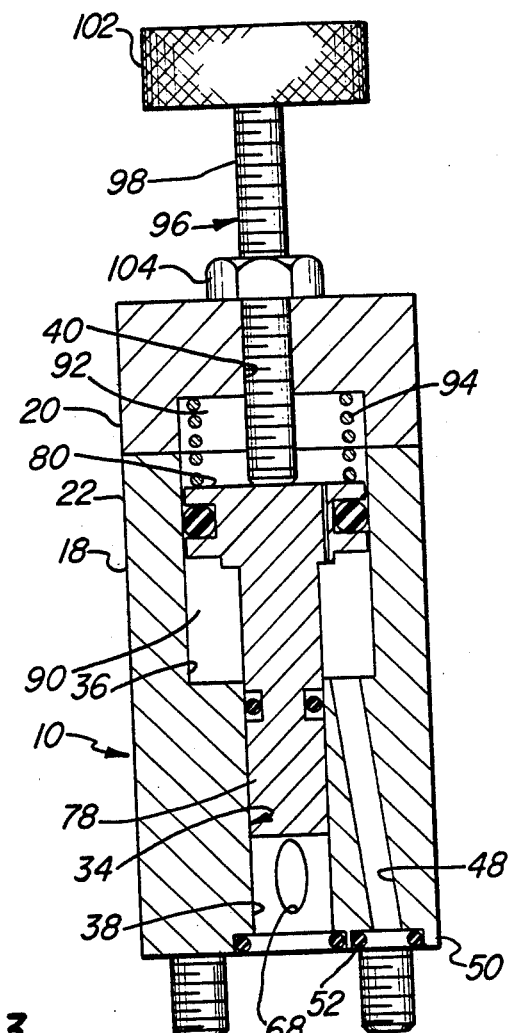
FIG. 5 is a cross-sectional view of the nozzle taken along line 5—5 of FIG. 2.
Figure 2:
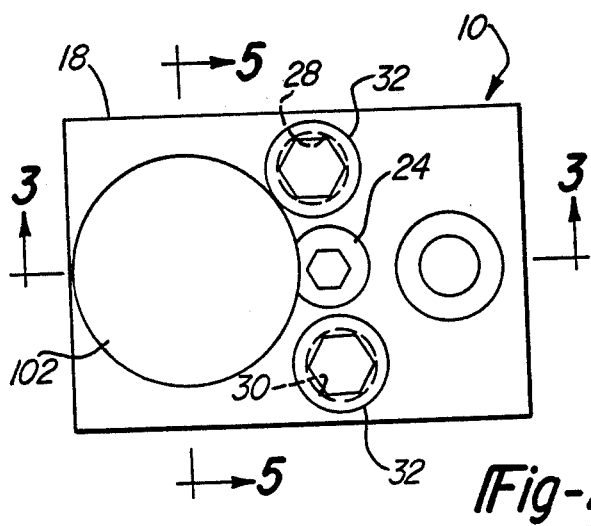
FIG. 2 is a top view of the nozzle in accordance with this invention.

Passageway 66 is provided which communicates poppet stem passageway portion 38 with enlarged passageway portion 58. In accordance with one feature of this invention, the longitudinal axes of poppet stem passageway portion 38 and passageway 66 intersect at an acute angle such that their intersection defines an elliptically shaped orifice 68 within passageway portion 38 (as best shown in FIG. 4). Another passageway 70 is provided which communicates the lowermost portion of passageway portion 56 with passageway 66 at a position adjacent passageway portion 38. Preferably, passageways 70 and 66 intersect at a right angle.

Poppet valve assembly 74 includes valve element 76 having stem portion 78 and head portion 80. Annular groove 82 in head portion 80 retains O-ring 84, and groove 86 in stem portion 78 retains O-ring 88. Poppet valve head 80 divides poppet valve chamber 36 into a lower actuating chamber portion 90 and an upper vented chamber portion 92. A small diameter bleed passage 106 is provided in head portion 80 to permit a minute fluid flow between actuating chamber 90 and vented chamber 92. Coil spring 94 is installed within the vented chamber portion 92 to normally bias valve element 76 in the downward resting position shown in FIG. 3.

Liquid control adjuster 96 includes a central threaded stem 98 with an enlarged knurled adjusting head 102. Lock nut 104 is threaded onto stem 98 to maintain the adjuster in a desired position. Control adjuster 96 establishes the uppermost positioning of valve element 76 as shown in FIG. 4. This action has the effect of controlling the portion of elliptical orifice 68 which is uncovered for the flow of liquid when the nozzle is operating as shown in FIG. 4. As will be explained subsequently, this configuration permits precise control over the concentration of liquid which is discharged from atomizing nozzle 10.

Figure 3:
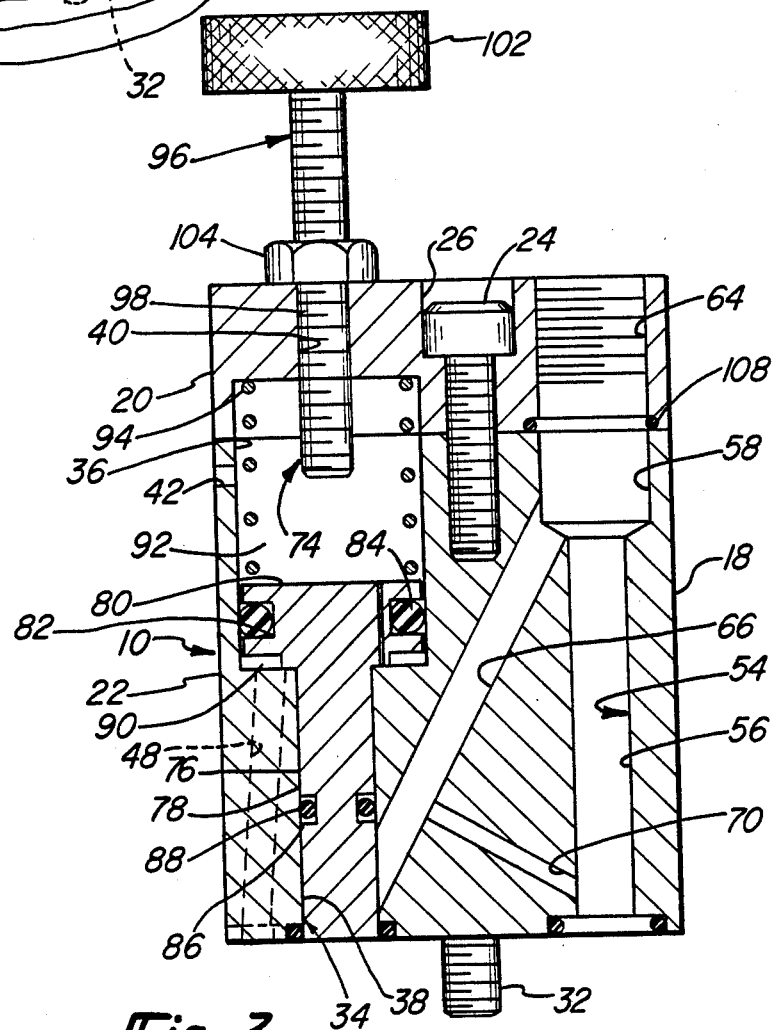
FIG. 3 is a cross-sectional view of the nozzle taken along line 3—3 of FIG. 2 showing the elements in their resting position.

Operation of atomizing nozzle 10 will now be explained particularly with reference to FIGS. 3 and 4. In the resting position shown in FIG. 3, valve element 76 assumes its lowermost position due to the biasing force applied by coil spring 94. In this position, the pressurized liquid supplied to passageway portion 38 cannot communicate with passageway 66. When it is desired to operate atomizing nozzle 10, a positive pressure is provided through control air passageway 48 which causes poppet valve element 76 to move to the raised position against spring 94 until it contacts stem 78. In this position, at least a portion of elliptical orifice 68 is uncovered, thereby allowing liquid to flow into passageway 66. Simultaneously, pressurized blow air is provided through passageway 54. A portion of the blow air is transferred to passageway 66 via passageway 70. This small amount of blow air rapidly expands into passageway 66. This effect partially atomizes the liquid. The partially atomized liquid flows upwardly until it enters into the enlarged portion 58 of passageway 54 where the blow air is more fully expanded to explode the liquid into finely divided droplets. These inventors have found that this pre-atomization function is particularly advantageous in permitting extremely low liquid flow rates to be fully atomized and uniformly distributed in the airstream.

Very precise control of the liquid flow rate is provided through use of elliptical orifice 68. Since elliptical orifice 68 has a longer major dimension than a round bore having the same equivalent orifice size, a longer stroke of valve element 76 is provided which allows less critical setting of the valve. Elliptical bores are difficult to form; however, in accordance with the invention, elliptical orifice 68 is provided easily by boring round holes and intersection them at an acute angle.

At the conclusion of spray operation, control air pressure is terminated and poppet valve element 76 returns to its resting position. Preferably, the system for controlling nozzle 10 allows blow air to flow for a given period of time after the nozzle has returned to its resting condition. This provides for a self-cleaning action since all the liquid is blown out of the various passages. Both passages 54 and 66 are fully cleared of liquid by the flow of blow air. This operation results in the elimination of residual lubricant within nozzle 10 after completion of the spraying cycle.

When nozzle 10 is operating, a small amount of oil mist lubricated control air is permitted to be vented from actuating chamber 90 to vented chamber 92. Lubricant droplets are therefore carried into vented chamber 92 to coat the chamber walls and spring 94 before passing to the atmosphere through vent port 42. When control air pressure is reduced, bleed passage 106 assists valve element 76 to return to its resting position and permits the lubricated air to be transferred from actuating chamber 90 to vented chamber 92. This operation prevents a negative pressure from existing within vented chamber 92 which would enable atmospheric air containing contaminants from entering the vented chamber through vent port 42 which could degrade the performance of poppet valve assembly 74 over time.

While the above description constitutes the preferred embodiments of the present invention, it will be appreciated that the invention is susceptible to modification, variation and change without departing from the proper scope and fair meaning of the accompanying claims.

What is claimed is:

1. An atomizing nozzle for a spray apparatus for selectively applying an atomized liquid to the working surfaces of forming apparatuses, comprising:
    a housing,
    a first elongated fluid passageway extending substantially linearly through said housing and having an inlet at one end and an outlet at the other end,
    a second fluid passageway spaced from said first passageway and having an inlet at one end thereof wherein the longitudinal axis of said first and said second passageways are substantially parallel,
    a third fluid passageway having one end opening into said first passageway intermediate the ends thereof and the other end opening into said second fluid passageway, said third passageway having a longitudinal axis which intersects the longitudinal axis of said second passageway at an acute angle whereby said intersection creates an elliptically shaped orifice within said second passageway,
    valve means disposed within said second fluid passageway and movable in response to a control signal from a closed position overlying said orifice to an operative position wherein at least a portion of said orifice is uncovered such that said liquid supplied to said second passageway inlet is permitted to flow into said third passageway and become mixed with blow air introduced into said first passageway inlet such that atomized liquid is discharged from said first passageway outlet, and valve positioning means for adjustably controlling the extent to which said orifice is uncovered when said valve means is in said operative position thereby modulating the rate of flow of said liquid into said third fluid passageway.

2. The atomizing nozzle according to claim 1 wherein said valve means comprises a poppet valve movable in a chamber defined by said housing, said poppet valve having a head portion disposed in said chamber and a stem portion disposed in said second passageway.

3. The atomizing nozzle according to claim 2 wherein said valve positioning means comprises a threaded stem meshing with a threaded bore within said housing which engages said poppet valve when said valve means is in said operative position.

4. The atomizing nozzle according to claim 2 wherein said poppet valve head portion divides said chamber into an actuating chamber portion and a vented chamber portion, said housing defining a control passageway having an inlet for receiving a control fluid signal which causes said poppet valve to move to said operative position, said vented chamber exposed to the atmosphere by a vent port, and spring means acting on said poppet valve to urge said valve into said closed position, said poppet valve head having a bleed passageway therein which communicates said actuating chamber with said vented chamber such that when said control signal is lubricated air, a portion of said lubricated air entering said actuating chamber leaks to said vented chamber through said bleed passageway to thereby coat the surfaces of said vented chamber with said lubricant, and wherein said bleed passageway permits said lubricated air to flow into said vented chamber when the pressure of said control signal is reduced such that when said poppet valve moves to said closed position, said lubricated air is permitted to flow into said vented chamber thereby equalizing the pressure in said vented chamber to prevent contaminants from entering said vented chamber through said vent port.

5. The atomizing nozzle according to claim 1 further comprising, a fourth fluid passageway having one end opening into said third passageway adjacent said orifice and another end opening into said first passageway adjacent said inlet such that when said liquid flows into said third passageway, a portion of said blow air flowing into said first passageway inlet flows into said fourth passagewya and mixes with said liquid to thereby preatomize said liquid prior to its introducing into said first passageway, and wherein the longitudinal axis of said third and said fourth passageways intersect at a substantially right angle.

6. The atomizing nozzle according to claim 1 wherein the longitudinal axes of said first and second passageways are parallel.

7. An atomizing nozzle for a spray apparatus for selectively applying an atomized liquid to the working surfaces of forming apparatuses, comprising:

a housing, a first elongated fluid passageway extending substantially linearly through said housing and having an inlet at one end and an outlet at the other end, a second fluid passageway spaced from said first passageway and having an inlet at one end thereof.

a third fluid passageway having one end opening into said first passageway intermediate the ends thereof and the other end opening into said second fluid passageway, thereby defining an orifice in the wall of said second fluid passageway, valve means disposed within said second fluid passageway and movable in response to a control signal from a closed position overlying said orifice to an operative position wherein at least a portion of said orifice is uncovered such that fluid supplied to said second passageway inlet is permitted to flow into said third passageway and become mixed with blow air introduced into said first passageway inlet such that atomized liquid is discharged from said first passageway outlet, a fourth fluid passageway having one end opening into said third passageway adjacent said orifice and intersecting said third fluid passageway at a substantially right angle and another end opening into said first passageway adjacent said inlet such that when said valve means moves to said operative position, said liquid flows into said third passageway and wherein a portion of blow air applied to said first fluid passageway inlet mixes with said liquid in said third passageway by passage through said fourth passageway to preatomize said liquid, and wherein the remainder of said blow air mixes with said preatomized liquid exiting said third passageway to thereby more completely atomize said liquid.

8. The atomizing nozzle according to claim 7 wherein said valve means comprises a poppet valve movable in a chamber defined by said housing, said poppet valve having a head portion disposed in said chamber and a stem portion disposed in said second passageway.

9. The atomizing nozzle according to claim 8 further comprising valve positioning means for adjustably controlling the extent to which said orifice is uncovered when said valve means is in said operative position thereby modulating the rate of flow of said liquid into said third fluid passageway, wherein said valve positioning means comprises a threaded stem meshing with a threaded bore within said housing which engages said poppet valve when said valve means is in said operative position.

10. The atomizing nozzle according to claim 8 wherein said poppet valve head portion divides said chamber into an actuating chamber portion and a vented chamber portion, said housing defining a fifth fluid passageway having an inlet for receiving a control fluid signal which causes said poppet valve to move to said operative position, said vented chamber exposed to the atmosphere by a vent port, and spring means acting on said poppet valve to urge said valve into said closed position, said poppet valve head having a bleed passageway therein which communicates said actuating chamber with said vented chamber such that when said fluid control signal is lubricated air, a portion of said lubricated air entering said actuating chamber leaks to said vented chamber through said bleed passageway to thereby coat the surfaces of said vented chamber with said lubricant, and wherein said bleed passageway permits said lubricated air to flow into said vented chamber when the pressure of said control signal is reduced such that when said poppet valve moves to said closed position, said lubricated air is permitted to flow into said vented chamber thereby equalizing the pressure in said vented chamber to prevent contaminants from entering said chamber through said vent port.

11. The atomizing nozzle according to claim 7 wherein the longitudinal axes of said first and second passageways are parallel.

12. The atomizing nozzle according to claim 7 wherein said third and fourth passageways intersect at a right angle.

13. The atomizing nozzle according to claim 7 wherein said second and third passageways intersect at an acute angle whereby said orifice is elliptical.

14. An atomizing nozzle for a spray apparatus for selectively applying an atomized liquid to the working surfaces of forming apparatuses, comprising:
a housing,
a first elongated fluid passageway extending substantially linearly through said housing and having an inlet at one end and an outlet at the other end,
a second fluid passageway spaced from said first passageway and having an inlet at one end thereof,
a third fluid passageway having one end opening into said first passageway intermediate the ends thereof and the other end opening into said second fluid passageway, said third passageway having a longitudinal axis which intersects the longitudinal axis of said second passageway at an acute angle whereby said intersection creates an elliptically shaped orifice within said second passageway,
valve means disposed within said second fluid passageway and movable in response to a control signal from a closed position overlying said orifice to an operative position wherein at least a portion of said orifice is uncovered such that fluid supplied to said second passageway inlet is permitted to flow into said third passageway and become mixed with blow air introduced into said first passageway inlet such that atomized liquid is discharged from said first passageway outlet,
valve positioning means for adjustably controlling the extent to which said orifice is uncovered when said valve means is in said operative position thereby modulating the rate of flow of said liquid into said third fluid passageway,
a fourth fluid passageway having one end opening into said third passageway adjacent said orifice and intersecting said third fluid passageway at a substantially right angle and another end opening into said first passageway adjacent said inlet such that when said valve means moves to said operative position, said liquid flows into said third passageway and wherein a portion of blow air applied to said first fluid passage inlet intermittently mixes with said liquid by passage through said fourth passageway to preatomize said liquid, and wherein the remainder of said blow air mixes with said preatomized liquid exiting said third passageway to thereby more completely atomize said liquid.

15. The atomizing nozzle according to claim 14 wherein said valve means comprises a poppet valve movable in a chamber defined by said housing, said poppet valve having a head portion disposed in said chamber and a stem portion disposed in said second passageway.

16. The atomizing nozzle according to claim 15 wherein said valve positioning means comprises a threaded stem meshing with a threaded bore within said housing which engages said poppet valve when said valve means is in said operative position.

17. The atomizing nozzle according to claim 15 wherein said poppet valve head portion divides said chamber into an actuating chamber portion and a vented chamber portion, said housing defining a fifth fluid passageway having an inlet for receiving a control fluid signal which causes said poppet valve to move to said operative position, said vented chamber exposed to the atmosphere by a vent port, and spring means acting on said poppet valve to urge said valve into said closed position, said poppet valve head having a bleed passageway therein which communicates said actuating chamber with said vented chamber such that when said control signal is lubricated air, a portion of said lubricated air entering said actuating chamber leaks to said vented chamber through said bleed passageway to thereby coat the surfaces of said vented chamber with said lubricant, and wherein said bleed passageway permits said lubricated air to flow into said vented chamber when the pressure of said control signal is reduced such that when said poppet valve moves to said closed position, said lubricated air is permitted to flow into said vented chamber, thereby equalizing the pressure in said vented chamber to prevent contaminants from entering said vented chamber through said vent port.

* * * * *